US012705005B2

(12) United States Patent
Jeran et al.

(10) Patent No.: US 12,705,005 B2
(45) Date of Patent: Aug. 11, 2026

(54) PRINTING DEVICE CONSUMABLE ITEM AUTHENTICATION BASED ON MEASURED ANALOG VALUES OF OPERATIONAL PARAMETERS

(71) Applicant: Hewlett-Packard Development Company, L.P., Spring, TX (US)

(72) Inventors: Paul L. Jeran, Boise, ID (US); Jeffrey H. Luke, Boise, ID (US); Gabriel Scott McDaniel, Boise, ID (US); Juan Guzman, Boise, ID (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 67 days.

(21) Appl. No.: 18/562,302

(22) PCT Filed: May 28, 2021

(86) PCT No.: PCT/US2021/034761
§ 371 (c)(1),
(2) Date: Nov. 18, 2023

(87) PCT Pub. No.: WO2022/250687
PCT Pub. Date: Dec. 1, 2022

(65) Prior Publication Data
US 2024/0241676 A1 Jul. 18, 2024

(51) Int. Cl.
*G06F 3/12* (2006.01)

(52) U.S. Cl.
CPC .......... *G06F 3/1229* (2013.01); *G06F 3/1208* (2013.01); *G06F 3/1284* (2013.01)

(58) Field of Classification Search
None
See application file for complete search history.

(56) References Cited

U.S. PATENT DOCUMENTS

| | | | | |
|---|---|---|---|---|
| 2005/0206672 | A1 | 9/2005 | Adkins et al. | |
| 2007/0081828 | A1* | 4/2007 | Radulski | G03G 15/6529 399/27 |
| 2012/0076515 | A1* | 3/2012 | Rapkin | G03G 15/55 399/24 |
| 2012/0076516 | A1* | 3/2012 | Rapkin | G03G 15/5079 399/24 |
| 2012/0134686 | A1 | 5/2012 | Jones et al. | |
| 2016/0173284 | A1 | 6/2016 | Jeran et al. | |
| 2016/0173287 | A1 | 6/2016 | Bowen | |
| 2018/0124280 | A1 | 5/2018 | Panshin et al. | |
| 2019/0392378 | A1* | 12/2019 | Alvo | G06Q 10/087 |
| 2020/0164656 | A1 | 5/2020 | Yamada et al. | |
| 2022/0348363 | A1* | 11/2022 | Colson | B65B 3/02 |

* cited by examiner

*Primary Examiner* — Darryl V Dottin
(74) *Attorney, Agent, or Firm* — Michael Dryja

(57) ABSTRACT

A consumable item of a printing device is authenticated based on analog values of operational parameters of the printing device measured during usage of the consumable item within the printing device. An action is performed based on whether authentication of the consumable item of the printing device was successful or not.

15 Claims, 4 Drawing Sheets

100
MEASURED ANALOG OPERATIONAL PARAMETER VALUES
110
102
PRINTING DEVICE
104
CONSUMABLE ITEM
108
NETWORK
106
COMPUTING DEVICE
CONSUMABLE ITEM AUTHENTICATION
112

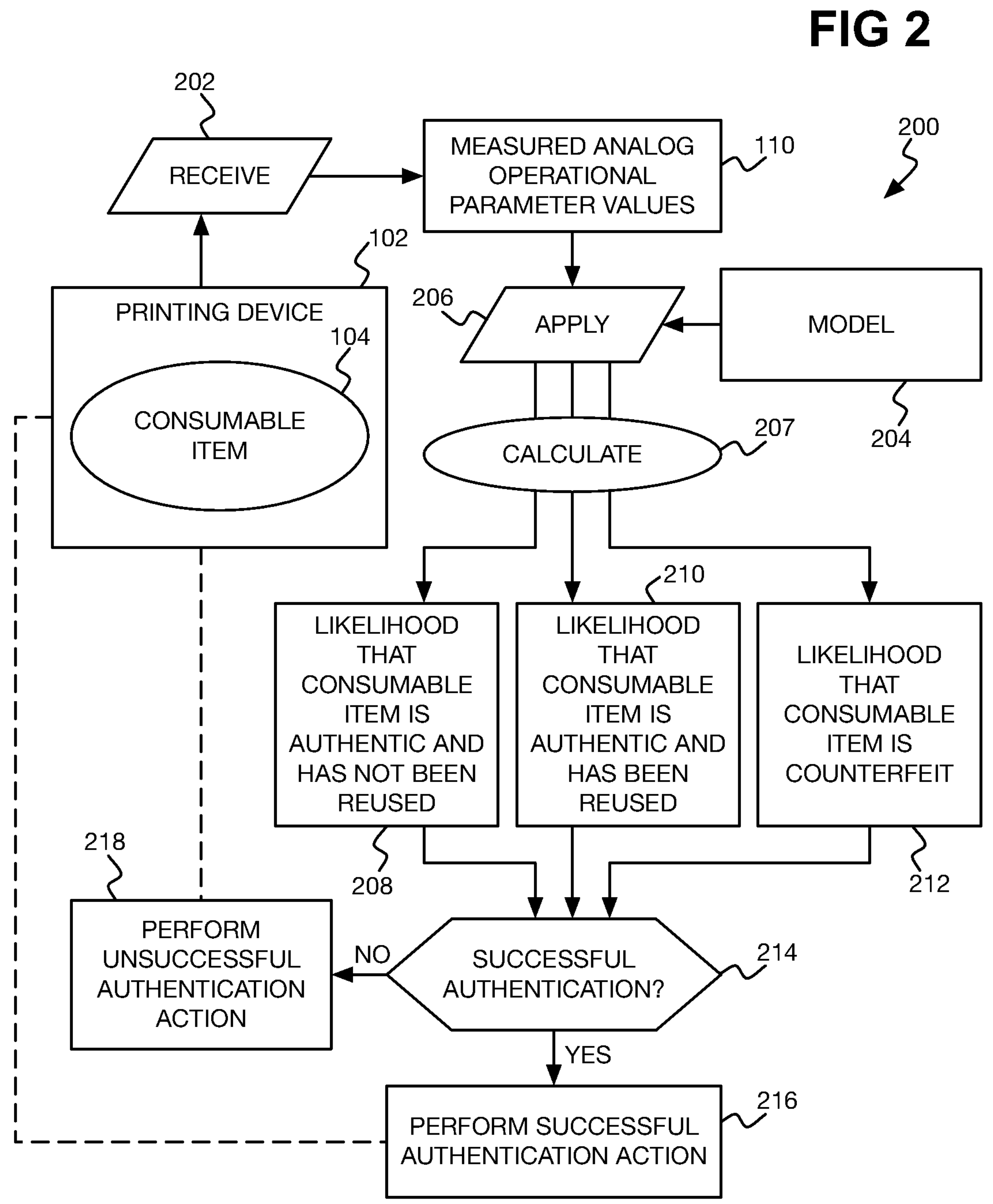
FIG 2
202
RECEIVE
MEASURED ANALOG OPERATIONAL PARAMETER VALUES
110
200
102
PRINTING DEVICE
104
CONSUMABLE ITEM
206
APPLY
MODEL
204
CALCULATE
207
210
LIKELIHOOD THAT CONSUMABLE ITEM IS AUTHENTIC AND HAS NOT BEEN REUSED
LIKELIHOOD THAT CONSUMABLE ITEM IS AUTHENTIC AND HAS BEEN REUSED
LIKELIHOOD THAT CONSUMABLE ITEM IS COUNTERFEIT
208
212
218
PERFORM UNSUCCESSFUL AUTHENTICATION ACTION
NO
SUCCESSFUL AUTHENTICATION?
214
YES
PERFORM SUCCESSFUL AUTHENTICATION ACTION
216

300
304
MEASUREMENT
310
306
305
308
302
TIME
SPECIFIED TIME INTERVAL
301

322
320
324
AUTHENTIC CONSUMABLE ITEM
VALUE RANGE 344
346
340
352
VALUE
348
350
TIME
342

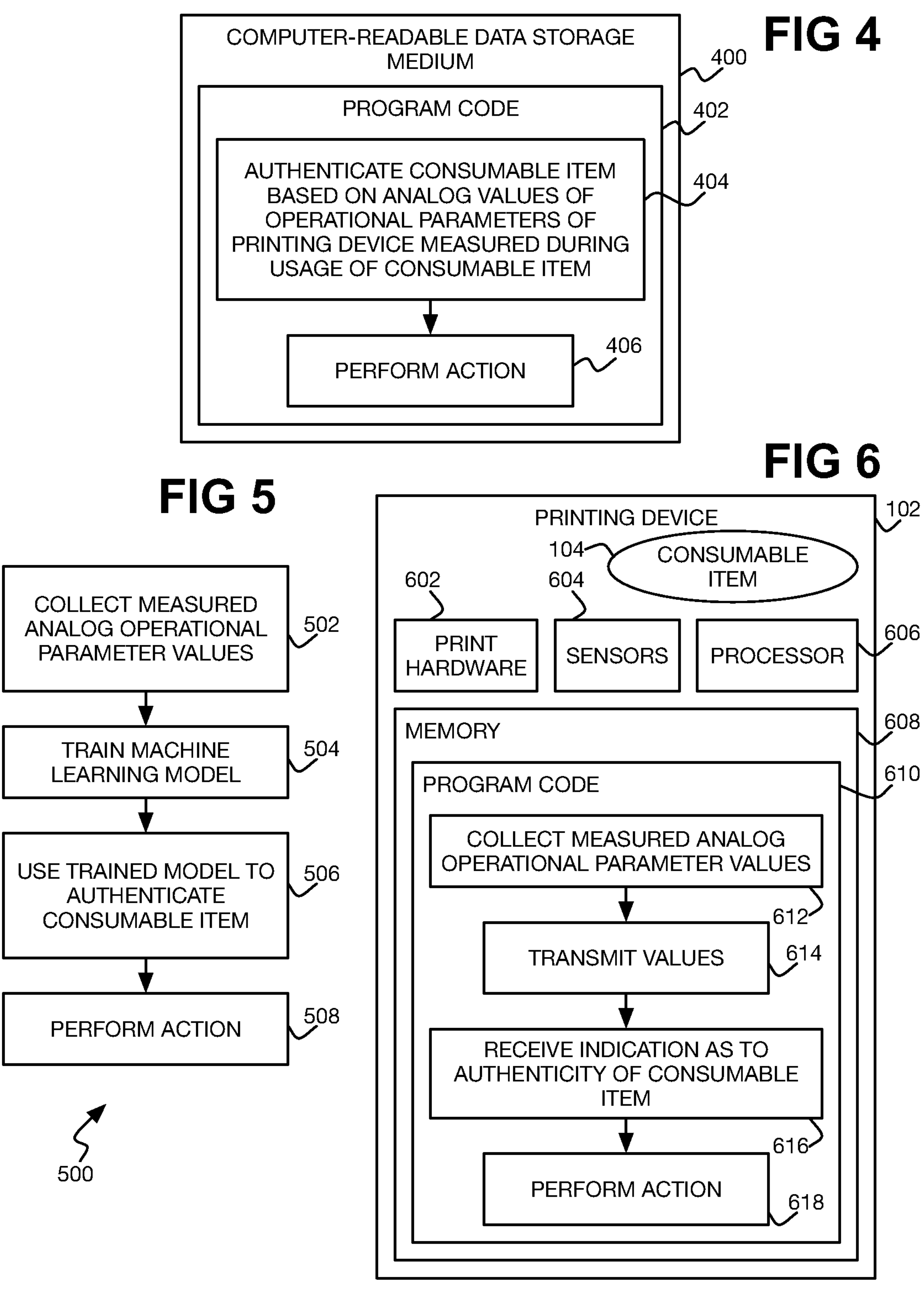
FIG 4
COMPUTER-READABLE DATA STORAGE MEDIUM
400
PROGRAM CODE
402
AUTHENTICATE CONSUMABLE ITEM BASED ON ANALOG VALUES OF OPERATIONAL PARAMETERS OF PRINTING DEVICE MEASURED DURING USAGE OF CONSUMABLE ITEM
404
PERFORM ACTION
406
FIG 5
COLLECT MEASURED ANALOG OPERATIONAL PARAMETER VALUES
502
TRAIN MACHINE LEARNING MODEL
504
USE TRAINED MODEL TO AUTHENTICATE CONSUMABLE ITEM
506
PERFORM ACTION
508
500
FIG 6
PRINTING DEVICE
102
104
CONSUMABLE ITEM
602
604
PRINT HARDWARE
SENSORS
PROCESSOR
606
MEMORY
608
PROGRAM CODE
610
COLLECT MEASURED ANALOG OPERATIONAL PARAMETER VALUES
612
TRANSMIT VALUES
614
RECEIVE INDICATION AS TO AUTHENTICITY OF CONSUMABLE ITEM
616
PERFORM ACTION
618

PRINTING DEVICE CONSUMABLE ITEM AUTHENTICATION BASED ON MEASURED ANALOG VALUES OF OPERATIONAL PARAMETERS

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

BRIEF DESCRIPTION OF THE DRAWINGS

FIG. 2 is a diagram of an example process to determine whether a consumable item of a printing device is authentic based on analog values of operational parameters measured during usage of the consumable item within the printing device.

FIG. 4 is a diagram of an example non-transitory computer-readable data storage medium FIG. 5 is a diagram of an example method.

FIG. 6 is a diagram of an example printing device.

DETAILED DESCRIPTION

Figure 1:
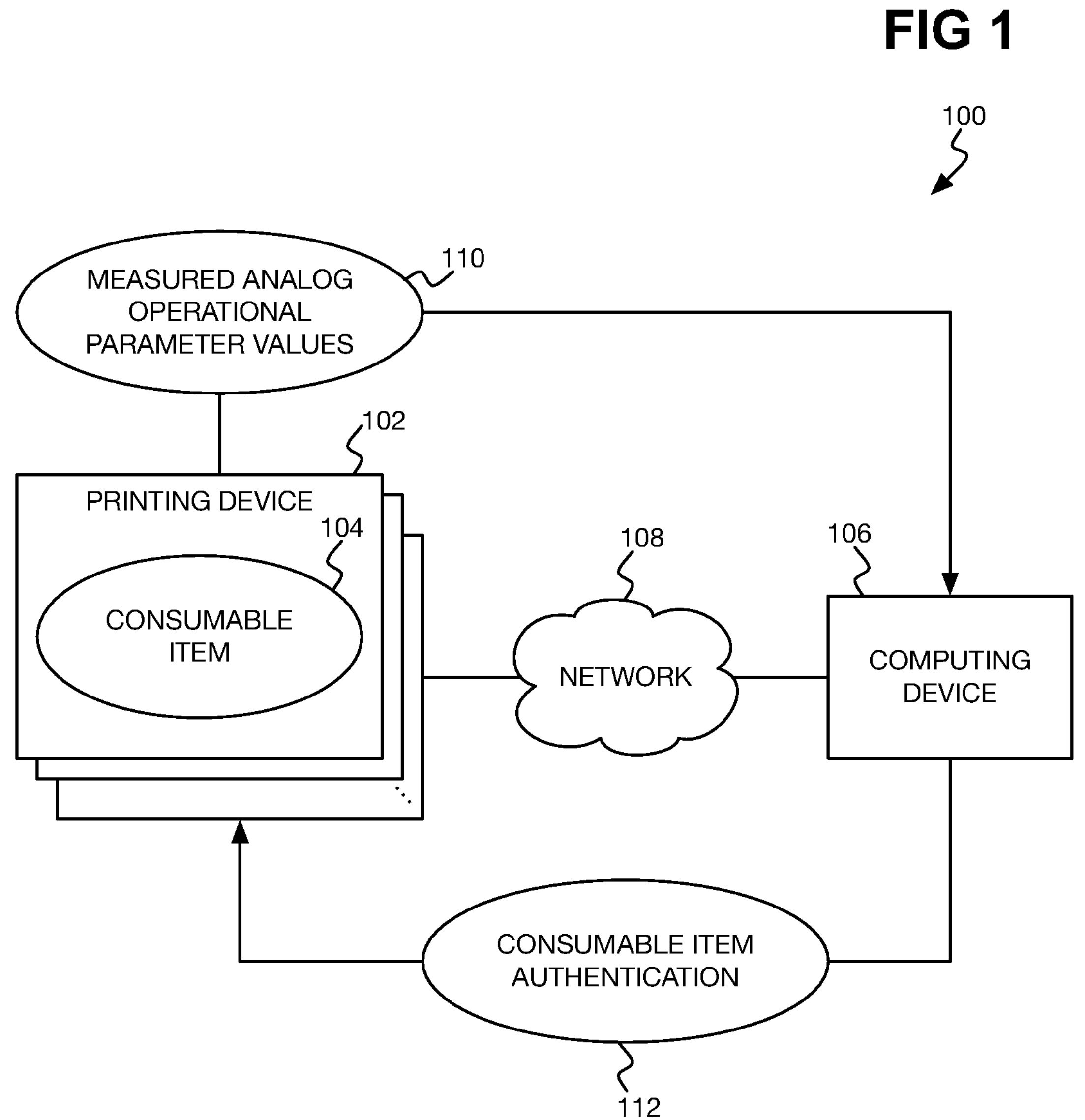
FIG. 1 is a diagram of an example system including printing devices in which consumable items are used.

As noted in the background, printing devices deposit print material to form images on media or, in the case of three-dimensional (3D) printing devices, to additively build (3D) objects. A printing device can include a cartridge of print material that the device uses for printing. As the printing device prints print jobs, print material is consumed from the cartridge. When the cartridge is empty or is running low on print material, the cartridge may be replaced with a replacement cartridge that has a fresh (e.g., full) supply of print material. A cartridge is thus one type of a consumable item that a printing device uses for printing. Other examples include fuser assemblies, developer assemblies, transfer belts, and so on, in the case of a laser-printing device, and fluid-ejection (e.g., inkjet) printheads in the case of a fluid-ejection (e.g., inkjet) device that employs separately replaceable printheads and fluid (e.g., ink) supplies.

To ensure that printing devices print with the best image and print quality possible, manufacturers advise users that they should use authorized consumable items within the devices. An authorized consumable item can be one that is manufactured by or for the manufacturer of a printing device and acquired from a trusted party. A user purchasing such a consumable item can therefore be certain that usage of the item within his or her printing device will result in the best performance possible, and will not damage the device.

A consumable item that is manufactured by or for the manufacturer is an authentic consumable item. Acquisition of the consumable item from a trusted party ensures that the item has not been impermissibly reused, such as by being refilled with print material by an unauthorized party. That is, an otherwise authentic consumable item that is impermissibly refilled with print material can result in degraded image and print quality, and potentially damage the printing device, when reused in this manner. Acquisition from a trusted party further ensures that a counterfeit consumable item will not be passed off as authentic.

To guard against unauthorized consumable items from being used in printing devices, authentic consumable items may include authentication devices or other security features of varying sophistication by which the devices can verify that the items are indeed authentic. In certain cases, a printing device may prevent a consumable item that fails authentication from being used, for instance, to prevent possible damage to the device, or for other reasons. In other certain cases, instead of preventing use of the consumables, the printing device may change operating parameters to a different mode to reduce the likelihood of device damage. Such authentication devices can be in the form of security-hardened integrated circuits (ICs) that contain information which can be verified by the printing devices, potentially in communication with a computing device operated by the manufacturer.

Other authentication devices can be in the form of security tags, such as holograms, radio frequency identifier (RFID) and near-field communication (NFC) tags, and so on, either on the consumable items themselves or on the packaging of the items. In the former, either a printing device may verify that the consumable item is authentic by reading, scanning, or communicating with the security tag, or the user (or a computing device like a smartphone operated by the user) may verify authenticity, particularly in the case of a hologram or quality response (QR) code. In the latter, the user or a computing device operated by the user verifies authenticity, as opposed to the printing device. In both cases, authentication is binary: either authentication succeeds, or it fails.

However, inclusion of security features does not prevent unauthorized consumable items from being incorrectly authenticated for usage within printing devices. For example, an unauthorized party may successfully compromise the security features and copy them for inclusion in counterfeit consumable items. An unauthorized party may also be able to remove the security features from authentic consumable items for inclusion in counterfeit consumable items. Furthermore, such security features may not guard against an unauthorized party from impermissibly refilling spent authentic consumable items with print material. In each of these cases, an unauthorized consumable item may be successfully authenticated even though it is not an authentic consumable item that has not been impermissibly reused.

Techniques described herein provide for authentication of consumable items within printing devices in ways that do not have to rely on security features such as authentication devices of the items. Rather, authentication occurs on the basis of analog values of operational parameters of a printing device that are measured during usage of a consumable item within the printing device. For example, such operational parameters can include mechanical, electrical, thermal, acoustic, and other parameters that have their analog values measured by sensors of a printing device during usage of the consumable item within the printing device.

The inventors have novelly recognized that the measured analog values of a printing device's operational parameters can be indicative of whether a consumable item being used within the printing device is authentic or not. For example, operational parameters may have different distributions of measured analog values depending on whether the consumable item is authentic, authentic but impermissibly reused, or not authentic (i.e., counterfeit). The measured analog values of such operational parameters may vary differently over time during usage of authentic consumable items as compared to authentic but impermissibly reused or inauthentic consumable items.

Therefore, consumable items can be authenticated apart from any security features that the items may also have. Authentication can occur even if consumable items do not have such security features, or authentication can occur based both on the security features and the measured operational parameter analog values. Furthermore, such authentication can be probabilistic in nature, in that the likelihood that a consumable item is authentic or not provided, as opposed a binary determination as when using security features as noted above.

FIG. 1 shows an example system 100. The system 100 includes printing devices 102 in which consumable items 104 are used for printing. The printing devices 102 may be standalone printers or all-in-one (AIO) devices that include other functionality in addition to printing functionality, such as scanning, copying, and/or faxing functionality. Each printing device 102 may include one or multiple consumable items 104 of the same or different types. Example consumable items 104 include cartridges of print material, such as toner and inkjet cartridges. As the consumable items 104 are used for printing, they become depleted, and therefore have to be replaced within the printing devices 102 for printing to continue.

The printing devices 102 are communicatively connected to a computing device 106 over a network 108. The computing device 106 may be operated by or for the manufacturer of the printing devices 102. The printing devices 102 may periodically communicate information to the computing device 106 when the devices 102 are used by end users, such as in homes, businesses, and so on. The network 108 may be or include the Internet, an intranet, an extranet, a local area network (LAN), a wide area network (WAN), wired and wireless networks, a mobile telephony network, and so on.

During usage of the consumable items 104 within the printing devices 102, the devices 102 measure and transmit analog values 110 of operational parameters of the printing devices 102 to the computing device 106. On the basis of the measured analog operational parameter values 110, the computing device 106 can authenticate the consumable items 104. The computing device 106 may send an indication 112 as to whether authentication of a consumable item 104 was successful or not to the printing device 102 including the consumable item 104 in question. The printing device 102 may then prevent subsequent usage of the consumable item 104 for printing, or may at least alert the user that the item 104 could not be successfully authenticated.

The analog operational parameter values 110 measured at the printing devices 102 and transmitted to the computing device 106 can include measurable analog sensor values of electrical, mechanical, and/or other components of the devices 102. For example, during printing, a printing device 102 may apply different currents and voltages for successful toner transfer in the case of a laser printing device 102, or for successful ink ejection in the case of an inkjet printing device 102, depending on whether the consumable item 104 is authentic. Such currents and voltages can be measured by sensors within the printing devices 102. An authentic consumable item 104 may result in a particular current or voltage being greater or less during printing as compared to a consumable item 104 that is not authentic.

Similarly, a printing device 102 may apply different mechanical forces for successful usage of the consumable item 104 for printing, depending on whether the consumable item 104 is authentic. A poorly constructed counterfeit consumable item 104, for instance, may result in higher mechanical forces for successful usage of the item 104 within the printing device 102 as compared to a well constructed authentic consumable item 104. Somewhat similarly, an authentic consumable item 104 that is being impermissibly reused may start wearing out, and therefore present less mechanical resistance and thus result in lower mechanical forces than an authentic consumable item 104 that has not been reused.

The operational parameters for which analog values 110 are measured can thus include electrical, mechanical, thermal, acoustic, and other parameters of a printing device 102 that are affected by the consumable item 104 during usage within the device 102. However, such parameters include those other than the presence of and information stored on an authentication device or other security feature of the consumable item 104. Such parameters can likewise include parameters other than those indicative of the remaining amount (i.e., the current level) of the consumable item 104. Rather, the parameters can include operational parameters of electrical, mechanical, and/or other components of the printing device 102, and not those of the consumable item 104 itself.

FIG. 2 shows an example process 200 by which the computing device 106 can authenticate a consumable item 104 during usage of the item 104 within a printing device 102. The process 200 may be implemented as program code stored on a non-transitory computer-readable data storage medium and executed by the processor of the computing device 106. The process 200 includes receiving (202) the analog operational parameter values 110 measured by the printing device 102 during usage of the consumable item 104.

A model 204 is applied (206) to the measured analog operational parameter values 110 that have been received from the printing device 102 to authenticate the consumable item 104 of the printing device 102. The model 204 may be an algorithmic model such that a developed algorithm is applied to the parameter values 110. As a second example, the model 204 may be a statistical model.

As another example, the model 204 may be a trained machine learning model, which is thus a supervised machine learning model that is trained on the basis of measured analog operational parameter values 110 of consumable items 104 that are known or presumed to be authentic. How training data can be collected for training such a machine learning model 204 is described later in the detailed description. Furthermore, such a machine learning model 204 can be periodically retrained as additional measured analog values 110 are collected. The machine learning model 204 may be a neural network, or another type of machine learning model.

Application of the model 204 to the measured analog values 110 can specifically result in calculation (207) of one or multiple likelihoods indicative of authentication of the consumable item 104 being used within the printing device 102. For example, the model 204 may output the likelihood (i.e., the probability) 208 that the consumable item 104 is authentic and has not been (impermissibly) reused. The model 204 may additionally or instead output the likelihood (i.e., the probability) 210 that the consumable item 104 is authentic but has been (impermissibly) reused. In another implementation, the model 204 may not distinguish on the basis of whether an authentic consumable item 104 has been reused or not, such that the likelihoods 208 and 210 are in effect merged into a single likelihood that the item 104 is authentic. The model 204 may further additionally or instead output the likelihood (i.e., the probability) 210 that the consumable item 104 is counterfeit (i.e., not authentic).

The consumable item 104 is therefore authenticated (214) on the basis of the likelihoods 208, 210, and/or 212 provided by the model 204 from the measured analog operational parameter values 110. Whether authentication is successful or not can be determined by comparing the likelihoods 208, 210, and/or 212 to respective thresholds. For example, the consumable item 104 may be deemed as having been successfully authenticated so long as the likelihood 208 is greater than a higher, first threshold and the likelihoods 210 and 212 are each less than a lower, second threshold. If there is just one likelihood as to whether the consumable item 104 is authentic, the consumable item 104 may be successfully authenticated so long as this likelihood is greater than the first threshold and, if the likelihood 212 has also been provided, so long as the likelihood 212 is less than the second threshold. If just the likelihood 212 is provided, the consumable item 104 may be successfully authenticated so long as the likelihood 212 is less than the (second) threshold.

If the consumable item 104 is successfully authenticated (214), then a successful authentication-oriented action 216 can be performed, and if the item 104 is not successfully authenticated (214), then an unsuccessful authentication-oriented action 218 can be performed. Either action 216 or 218 can be performed in conjunction with the printing device 102 in which the consumable item 104 has been used. For example, an indication as to whether authentication was successful or not may be provided to the printing device 102, and the user of the device 102 may be alerted as to authentication of the consumable item 104, particularly if authentication failed (i.e., was unsuccessful). As another example, the printing device 102 may be instructed to prevent subsequent usage of the consumable item 104 for printing if authentication of the item 104 was unsuccessful.

The authentication of consumable items 104 within printing devices 102 can also be beneficial to the manufacturer of the printing devices 102 and/or of the consumable items 104. For example, the manufacturer may learn the percentage of consumable items 104 that are being used which are authentic as opposed to those which are counterfeit (and/or those which are authentic but have been impermissibly reused). Such information can assist the manufacturer in determining if counterfeit consumable items 104 have begun to be manufactured, and/or if authentic consumable items 104 have begun to be impermissibly refilled. For instance, if in a relatively short period of time there is a spike in counterfeit or impermissibly reused consumable items 104 being used, the manufacturer can assess what actions should be taken to reduce their usage. As another example, the manufacturer may learn in which geographic areas counterfeit and/or impermissibly reused consumable items 104 are more frequently used.

Figures 3A, 3B, 3C:
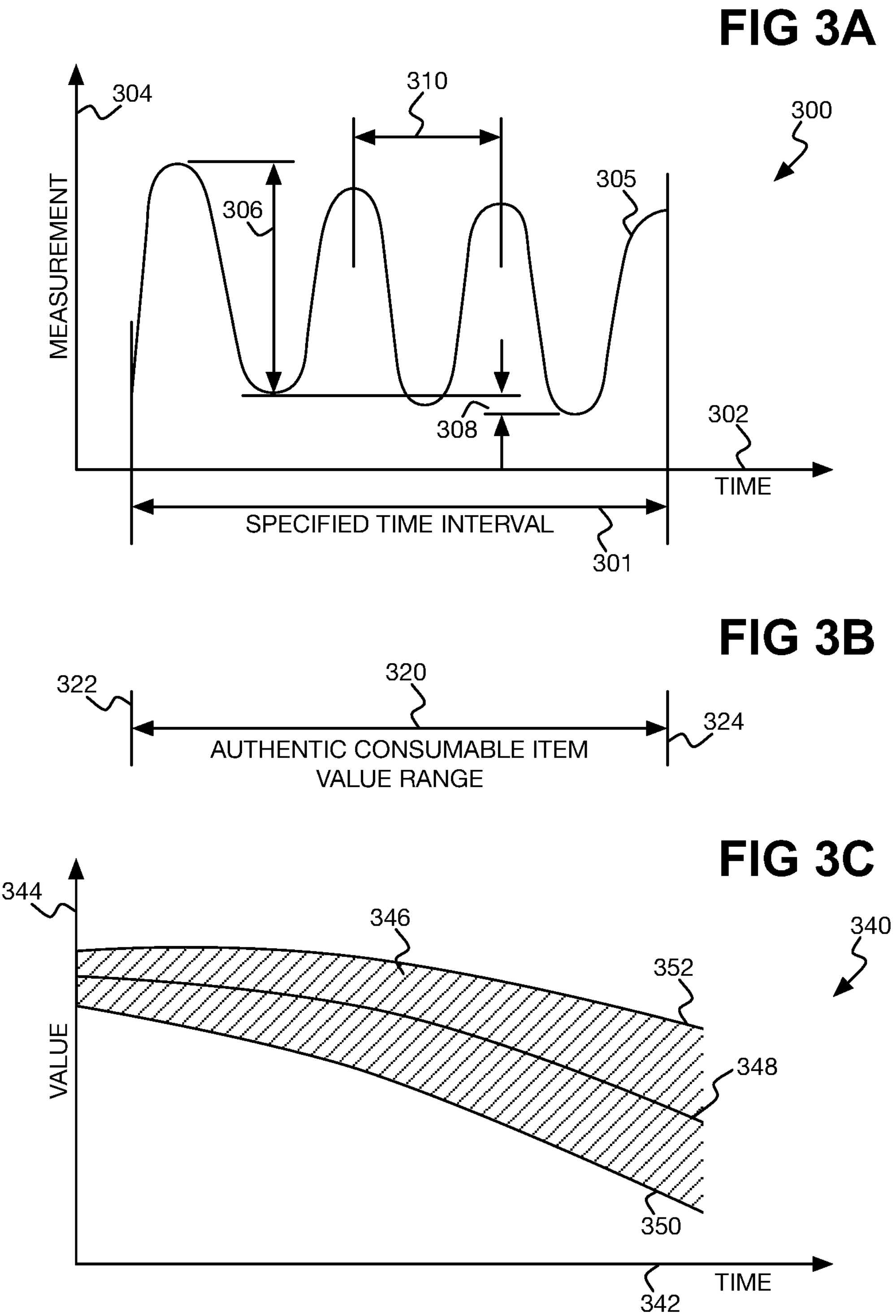
FIGS. 3A, 3B, and 3C are diagrams of different example ways by which measured analog operational parameter values can indicate whether a consumable item of a printing device is authentic.

FIGS. 3A, 3B, and 3C show different example ways by which measured analog operational parameter values 110 can indicate whether a consumable item 104 of a printing device 102 is authentic. The example ways can be employed by the model 204 in authenticating the consumable item 104. The model 204 may perform authentication using just one or two of these ways, or all three of these ways. The model 204 may perform authentication in other ways as well. That is, most generally, the model 204 distinguishes between authentic and counterfeit (and/or authentic but refilled) consumable items 104 based on the measured analog values 110 of the operational parameters, and thus may implicitly use the approaches of FIGS. 3A, 3B, and 3C, or other approaches altogether. The approaches of FIGS. 3A, 3B, and 3C are therefore not exhaustive. Instead, FIGS. 3A, 3B, and 3C are presented to illustrate how measured analog operational parameter values 110 can distinguish between authentic and counterfeit (and authentic/or but refilled) items 104.

In FIG. 3A, a graph 300 has an x-axis 302 denoting time and a y-axis 304 denoting the unit of measurement for a particular analog operational parameter. The line 305 indicates the measured analog values 110 of this operational parameter during a specified time interval 301. Whether the consumable item 104 is authentic or not can be determined based on the analog values 110 measured just during the specified time interval 301, and not during any prior time interval. In this example, the analog values 110 may be measured over successive specified time intervals 301 during usage of the consumable item 104, such that authentication occurs for each time interval 301. As another example, the analog values 110 may be measured during a particular specified time interval 301, such as during initial installation of the item 104 or at the beginning of each print job for which the item 104 is being used for printing.

The measured analog operational parameter values 110 may be considered for authentication purposes in a number of different ways. For example, the mean or median of the measured analog values 110 may be considered, or the maximum or minimum of the measured values 110 may be considered. The average peak-to-peak value 306 between adjacent peaks of the values 110 may be considered. The difference 308 between the highest minimum peak and the lowest minimum peak may be considered (likewise, the difference between the highest maximum peak and the lowest maximum peak may be considered). The mean, median, maximum, or minimum period 310 between adjacent maximum or minimum peaks may be considered.

In FIG. 3B, then, for any such value of FIG. 3A that is considered for authentication purposes, there may be a range 320 of values between a minimum value 322 and a maximum value 324 indicative of an authentic consumable item 104. Therefore, if the value in question is outside the range 320, the consumable item 104 may have a higher likelihood that it is not authentic, and if inside the range 320, the item 104 may have a higher likelihood that it is authentic. As one example, the likelihood of inauthenticity may increase the lower the value is from the minimum value 322 or the higher the value is from the maximum value 324. As another example, the likelihood of authenticity may be based on the actual distribution of the range 320 of values within known or presumed authentic consumable items 104.

There may in another implementation be a corresponding range 320 indicative of an authentic but impermissibly refilled consumable item 104, as well as a range 320 indicative of a counterfeit consumable item 104. The ranges 320 for authentic and not refilled consumable items 104, authentic but refilled consumable items 104, and counterfeit consumable items 104 may even overlap. In this case, the likelihoods that a consumable item 104 is authentic and not refilled, is authentic but refilled, and is counterfeit may be based on the distributions of their respective ranges 320 of values.

Each of the values of the operational parameter in question that is considered per FIG. 3A for authentication purposes may thus have a corresponding one or multiple ranges 320 per FIG. 3B. Furthermore, multiple values can be considered for each of multiple operational parameters per FIG. 3A, with corresponding one or multiple ranges 320 per FIG. 3B. Therefore, for a given specified time interval 301, the measured analog operational values 110 can provide a large amount of information on which basis the model 204 can authenticate the consumable item 104 used within the printing device 102.

In FIG. 3C, for any value of FIG. 3A that is considered for authentication purposes, how that value changes over time (i.e., over successive time intervals 301) while the consumable item 104 was used within the printing device 102 is considered when authenticating the consumable item 104. Specifically, there is a graph 340 having an x-axis 342 denoting time and a y-axis 344 denoting the unit of the value in question. A range 346 is identified that corresponds to how the value changes over time during usage of an authentic consumable item 104 within the printing device 102, from a median such value 348 between a minimum value 350 and a maximum value 352.

Therefore, as a value of FIG. 3A is considered for authentication purposes, a profile or signature of how the value changes over time can be constructed and compared to the profile or signature represented by the range 346 of FIG. 3C and that is indicative of authenticity. The degree to which the measured profile or signature matches the profile or signature of the range 346 can thus correspond to the likelihood that the consumable item 104 is authentic. For example, for any given time interval 301 of FIG. 3A, a value may be within a range 320 indicative of an authentic consumable item 104 per FIG. 3B. However, over time, the value may increase or decrease according to a profile or signature that differs or departs from the profile or signature represented by the range 346 of FIG. 3C. Therefore, the consumable item 104 may still be accorded a relatively high likelihood that the consumable item 104 is inauthentic.

In FIG. 3C, there may in another implementation be a corresponding range 346 indicative of an authentic but impermissibly refilled consumable item 104, as well as a range 346 indicative of a counterfeit consumable item 104, similar to as has been described above in relation to FIG. 3B. The ranges 346 for authentic and not refilled consumable items 104, authentic but refilled consumable items 104, and counterfeit consumable items 104 may even overlap. In this case, the likelihoods that a consumable item 104 is authentic and not refilled, is authentic but refilled, and is counterfeit may be based on how the profile or signature indicating how a value changes over time differs from the profiles or signatures of the respective ranges 346.

Similar to as noted in relation to FIG. 3B, each of the values of the operational parameter in question that is considered per FIG. 3A for authentication purposes may have a corresponding one or multiple ranges 346 per FIG. 3C. Likewise, multiple values can be considered for each of multiple operational parameters per FIG. 3A, with corresponding one or multiple ranges 346 per FIG. 3C. Therefore, the measured analog operational values 110 can in this way, too, provide a large amount of information over time on which basis the model 204 can authenticate the consumable item 104 used within the printing device 102.

Other ways, besides those of FIGS. 3A, 3B, and 3C, may also be used to assess authenticity. For example, signal response latency may be considered in the time domain as a basis upon which to determine whether the consumable item 104 is authentic. As an additional example, hysteresis may be considered in the time domain to determine whether the consumable item 104 is authentic.

As noted above, the model 204 authenticates the consumable item 104 on the basis of the measured analog operational parameter values 110 that can in effect implicitly consider the approaches of FIGS. 3A, 3B, and 3C, as well as other approaches that provide a way by which to assess authenticity. In the case of a machine learning model 204, the model 204 is thus trained on the basis of (at least) measured analog values 110 collected during usage of consumable items 104 within printing devices 102 that are known or presumed to be authentic. For example, prior to release of a new model of printing device 102, the manufacturer may perform testing in a laboratory or other non-field (i.e., non-end user) environment to collect measured values 110 on which basis to train the machine learning model 204.

However, collection of training data in a laboratory environment may be insufficient for training a machine learning model 204 to accurately assess authenticity of consumable items 104. Therefore, in another implementation, measured analog operational parameter values 110 collected during usage of consumable items 104 within printing devices 102 in the field (i.e., being used by end users) may be considered as training data for a specified time period after the initial release of a new model of printing device 102. That is, when a new model of printing device 102, with a corresponding new model of consumable item 104, is first released, the manufacturer may presume that during a specified time period thereafter that any consumable item 104 used within such a printing device 102 is authentic. For instance, it may be unlikely that many (if any) such newly released authentic consumable items 104 have been refilled, or that counterfeiters have begun to manufacture counterfeit consumable items 104.

Similarly, measured analog operational parameter values 110 collected during usage of consumable items 104 that are first used within given printing devices 102 may be considered as training data. That is, when an end user acquires a printing device 102, the printing device 102 can include a consumable item 104 for the user to use for printing. The manufacturer may presume, therefore, that the first consumable item 104 that is used in a given printing device 102 (i.e., such that no other consumable items were previously used in that device 102) is authentic. The likelihood that a user will use a counterfeit, authentic but refilled, or even a different authentic and not refilled consumable item 104 as the initial consumable item 104 used in the printing device 102 is low, in other words.

As also noted above, in the case in which the model 204 is a machine learning model 204, the machine learning model 204 may be periodically retrained, as measured analog operational parameter values 110 are collected from printing devices 102 used in the field. For example, the machine learning model 204 may identify particular consumable items 104 as being inauthentic (or authentic but refilled) on the basis of the analog values 110 measured during usage of the items 104 within the printing devices 102. If and when the consumable items 104 are returned to the manufacturer, the manufacturer can inspect the items 104 to determine whether or not they actually are inauthentic (or authentic but refilled). Therefore, the previously collected measured analog values 110 for the consumable items 104 can be used as additional training data on which basis to retrain the machine learning model 204.

FIG. 4 shows an example non-transitory computer-readable data storage medium 400 storing program code 402 executable by a processor, such as a processor of the computing device 106. The program code 402 is executable by the processor to perform processing. The processing includes authenticating a consumable item 104 of a printing device 102 based on analog values 110 of operational parameters of the printing device 102 measured during usage of the consumable item 104 within the printing device 102 (404). The processing includes performing an action based on whether authentication of the consumable item was successful or not (404).

FIG. 5 shows an example method 500. The method 500 may be implemented as program code stored on a non-transitory computer-readable data storage medium and executable by a processor, such as a processor of the computing device 106. Therefore, such a processor can perform the method 500. The method 500 includes collecting analog values 110 of operational parameters of printing devices 102 measured during usage of authentic consumable items 104 within the printing devices 102 (502), and training a machine learning model 204 in particular based on the collected analog values 110 (504). The method 500 includes then using the trained machine learning model 204 to authenticate a consumable item 104 within a printing device 102 (506), and can include performing an action based on whether authentication of the consumable item 104 was successful or not (508). For example, the action can include preventing subsequent usage of the consumable item 104 within the printing device 102 if the item 104 is deemed to not be authentic (or authentic but refilled).

FIG. 6 shows a block diagram of an example printing device 102 including a consumable item 104 that the device 102 uses for printing. The printing device 102 may be a standalone printer or an AIO printing device, as noted. The printing device 102 includes print hardware 602 that prints using the consumable item 104. For example, the print hardware 602 may include an inkjet printhead that ejects ink or other fluid from an ink or other fluid cartridge that constitutes the item 104. As another example, the print hardware 602 may include a laser printing drum and transfer roller, among other hardware, that transfer toner from a toner cartridge that constitutes the consumable item 104.

The printing device 102 includes sensors 604 that measure analog values 110 of operational parameters, such as mechanical, electrical, thermal, and acoustic parameters, of the printing device 102 during usage of the consumable item 104. The sensors 604 may be current sensors, voltage sensors, timers or time clocks, mechanical force sensors, optical sensors, and other types of sensors. The printing device 102 further includes a processor 606 and a memory 608 storing program code 610 that is executable by the processor 606. The processor 606 and the memory 608 may be discrete components in the case in which the processor 606 is a general-purpose processor, or may be integrated within the same component in the case of an application-specific IC (ASIC).

The program code 610 is executable by the processor 606 to perform processing. The processing includes collecting the analog values 110 of the operational parameters measured by the sensors 604 (612), and transmitting the collected analog values 110 to a computing device 106 that is to authenticate the consumable item 104 based on the collected analog values 110 (614). The processing can include receiving indication from the computing device 102 as to whether authentication of the consumable item 104 was successful (616), and performing an action based on whether authentication of the consumable item 104 was successful or not (618). For example, the action may include preventing subsequent usage of the consumable item 104 within the printing device 102 responsive to authentication being unsuccessful.

Techniques have been described for authenticating a consumable item of a printing device based on analog values of operational parameters of the printing device measured during usage of the consumable item. The techniques therefore novelly leverage measured analog operational parameter values in a way that heretofore they have not been used. For example, rather than using such measured analog values for predicting imminent failure of a printing device or a consumable item, the techniques use the measured values for consumable item authentication even if the item or the printing device is not in imminence of failure. The techniques can therefore supplement or supplant existing consumable item authentication techniques that rely on cryptographic security features like authentication devices included within consumable items and that store, contain, or represent information on which basis authentication can occur.

We claim:

1. A non-transitory computer-readable data storage medium storing program code executable by a processor to perform processing comprising:

authenticating a consumable item of a printing device based on analog values of operational parameters of the printing device measured during usage of the consumable item within the printing device; and performing an action based on whether authentication of the consumable item was successful or not.

2. The non-transitory computer-readable data storage medium of claim 1, wherein authenticating the consumable item comprises:

calculating a likelihood that the consumable item is authentic based on the analog values of the operational parameters of the printing device measured during the usage of the consumable item within the printing device; and determining whether the consumable item has been successfully authenticated or not based on the calculated likelihood that the consumable item is authentic.

3. The non-transitory computer-readable data storage medium of claim 2, wherein calculating the likelihood that the consumable item is authentic comprises:

applying a model to the analog values of the operational parameters of the printing device measured during the usage of the consumable item within the printing device.

4. The non-transitory computer-readable data storage medium of claim 1, wherein authenticating the consumable item comprises:

calculating a likelihood that the consumable item is authentic and has not been reused based on the analog values of the operational parameters of the printing device measured during the usage of the consumable item within the printing device;

calculating a likelihood that the consumable item is authentic and has been reused based on the analog values of the operational parameters of the printing device measured during the usage of the consumable item within the printing device;

calculating a likelihood that the consumable item is not authentic based on the analog values of the operational parameters of the printing device measured during the usage of the consumable item within the printing device; and determining whether the consumable item has been successfully authenticated or not based on the calculated likelihood that the consumable item is authentic and has not been reused, the calculated likelihood that the consumable item is authenticated and has been reused, and the calculated likelihood that the consumable item is not authentic.

5. The non-transitory computer-readable data storage medium of claim 1, wherein the analog values of the operational parameters of the printing device are measured during a specified time interval in which the consumable item was used within the printing device, and wherein the consumable item is authenticated based on the analog values of the operational parameters of the printing device measured during the specified time interval and not based on any analog values of the operational parameters of the printing device measured during any prior time interval.

6. The non-transitory computer-readable data storage medium of claim 1, wherein the analog values of the operational parameters of the printing device are measured over time while the consumable item was used within the printing device, and wherein the consumable item is authenticated based on how the measured analog values of the operational parameters of the printing device changed over time while the consumable item was used within the printing device.

7. The non-transitory computer-readable data storage medium of claim 1, wherein the analog values of the operational parameters of the printing device comprise measurable analog sensor values of components of the printing device.

8. The non-transitory computer-readable data storage medium of claim 1, wherein the operational parameters of the printing device comprise electrical, mechanical, acoustic, and/or thermal parameters of the printing device that are affected by the consumable item during usage within the printing device, and that are other than presence of and information stored on an authentication device of the consumable item.

9. The non-transitory computer-readable data storage medium of claim 1, wherein performing the action based on whether the authentication of the consumable item was success or not comprises:

preventing subsequent usage of the consumable item within the printing device responsive to the authentication being unsuccessful.

10. A method comprising:

collecting analog values of operational parameters of printing devices measured during usage of authentic consumable items within the printing devices;

training a machine learning model based on the collected analog values; and using the trained machine learning model to authenticate a consumable item within a printing device.

11. The method of claim 10, wherein collecting the analog values of the operational parameters of the printing devices comprises:

collecting the analog values of the operational parameters of the printing devices measured during the usage of consumable items that are first used within the printing devices, such that no other consumable items were previously used with the printing devices.

12. The method of claim 10, wherein collecting the analog values of the operational parameters of the printing devices comprises:

collecting the analog values of the operational parameters of the printing devices measured during the usage of consumable items within the printing devices for a specified time period after initial release of the printing devices.

13. The method of claim 10, further comprising:

preventing subsequent usage of the consumable item within the printing device responsive to unsuccessful authentication of the consumable item.

14. A printing device comprising:

a plurality of sensors to measure analog values of operational parameters of the printing device during usage of a consumable item within the printing device;

a processor; and a memory storing program code executable by the processor to:

collect the analog values of the operational parameters measured by the sensors; and transmit the collected analog values to a computing device that is to authenticate the consumable item based on the collected analog values.

15. The printing device of claim 14, wherein the program code is further executable by the processor to:

receive indication from the computing device as to whether authentication of the consumable item was successful; and prevent subsequent usage of the consumable item within the printing device responsive to the authentication being unsuccessful.

* * * * *